Dec. 7, 1926.
C. P. ASTROM
1,610,075
DRIVING CONNECTION FOR DUMP CAR BODIES
Filed August 18, 1922   2 Sheets-Sheet 1
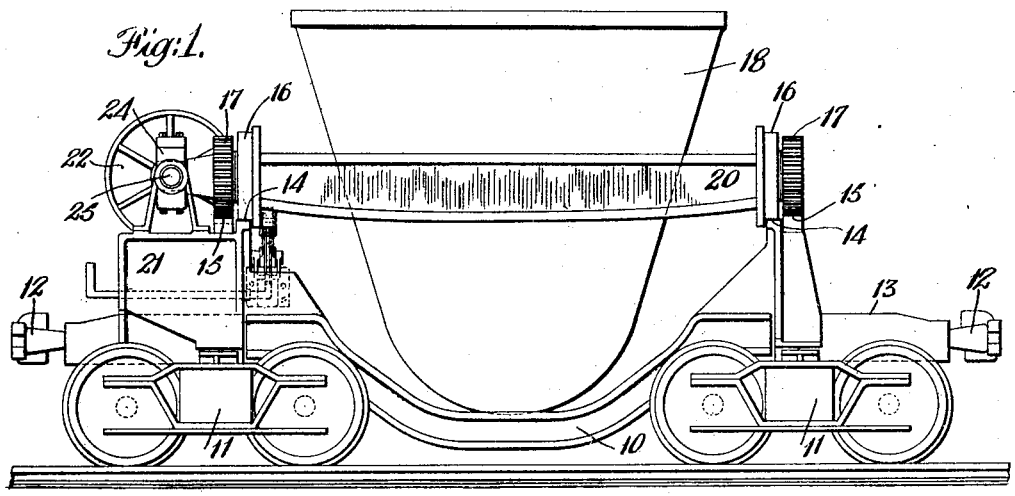
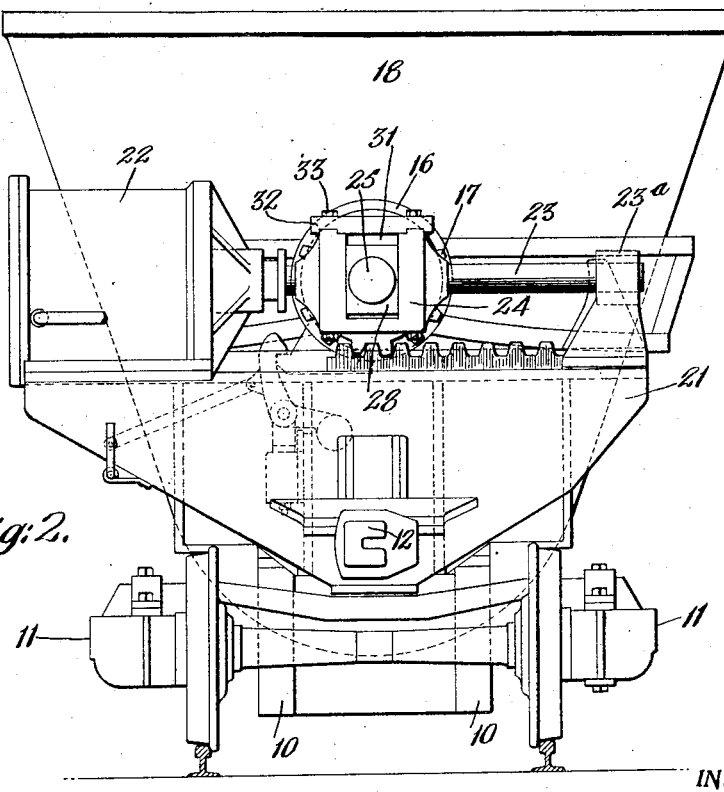
INVENTOR
Carl P. Astrom
BY
ATTORNEY Dec. 7, 1926.
C. P. ASTROM
1,610,075
DRIVING CONNECTION FOR DUMP CAR BODIES
Filed August 18, 1922    2 Sheets-Sheet 2
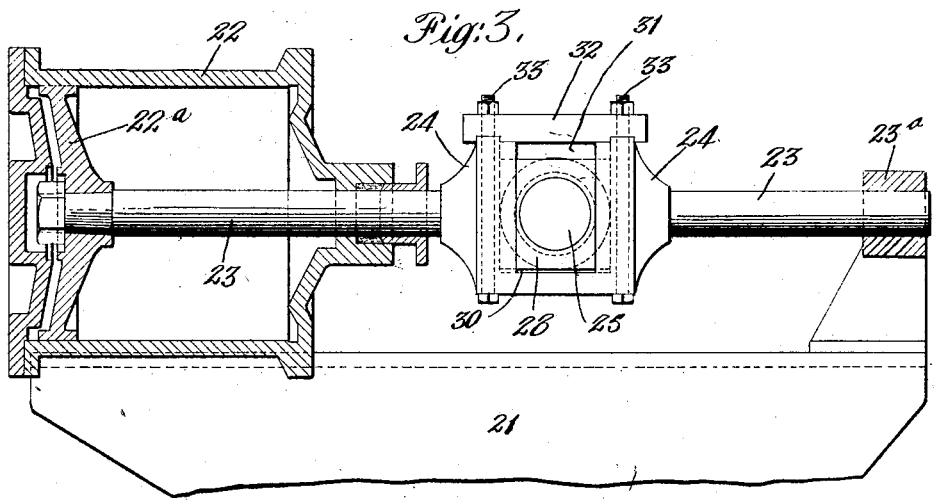
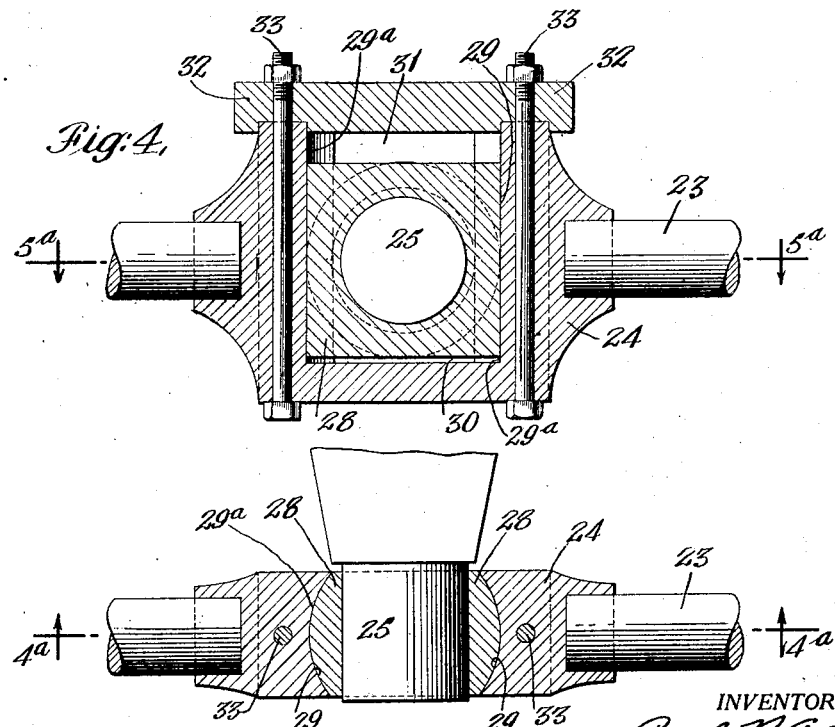
INVENTOR
Carl P. Astrom
BY
ATTORNEY Patented Dec. 7, 1926.

1,610,075

UNITED STATES PATENT OFFICE.

CARL P. ASTROM, OF EAST ORANGE, NEW JERSEY, ASSIGNOR TO M. H. TREADWELL COMPANY, A CORPORATION OF NEW YORK.

DRIVING CONNECTION FOR DUMP-CAR BODIES.

Application filed August 18, 1922. Serial No. 582,572.

This invention relates to tilting and laterally moving cinder or hot metal dumping cars and has for its object to provide means adapted to prevent strains or breakage of parts in case the car body trunnions get out of alignment with the racks.

The usual form of tilting and laterally moving dump car body is mounted to tilt and roll on trunnions along a track and is driven by a reciprocating motor. There is considerable danger of dirt, cinders, etc., getting into the rack teeth. Should such dirt clog the track or rack teeth or for any other reason cause one of the trunnions to roll ahead of the other and out of alignment, there is danger of rupture in some part since the driving connection between the motor and trunnion is not ordinarily adapted to be moved out of its plane of motion to accommodate such misalignment.

This invention removes the danger of breakage by providing a universal coupling between the driving member and the trunnion lug engaged thereby. Should the trunnions of the dumping car body become skewed or out of their usual alignment for any reason, this safety coupling between the driving member and the trunnion lug then prevents transverse or flexural strains being transmitted to the driving member. A bearing member contained within the crosshead of the driving motor is capable of turning to take up limited rotation of the trunnions in a horizontal plane. To compensate for movement of the trunnions in a vertical plane, the bearing member referred to is made vertically slidable within the crosshead which in conjunction with turning of the piston rod and piston in the cylinder enables the necessary flexibility of drive to be provided. This invention is adapted to cars which dump to only one side as well as to those which dump on both sides.

In the drawings:

Fig. 1 is a side view of a dumping car body provided with the improved coupling;

Fig. 2 is an end view of the device shown in Fig. 1,

Fig. 3 is an enlarged detail partly in section of the coupling shown in Fig. 2,

Fig. 4 is a section on the line 4$^a$—4$^a$ of Fig. 5, and

Fig. 5 is a section on the line 5$^a$—5$^a$ of Fig. 4.

The numeral 10 indicates the underframe supported at each end on the usual trucks 11 provided with the customary coupling equipment 12 and having on top a platform 13 on which are mounted the supports for the track rails 14 and the rack 15. The dumping car body 18 is mounted in a suitable yoke member 20 provided at the ends with trunnions 16 adapted to roll along the track rails 14. Gears 17 meshing with the teeth of the rack 15 prevent slipping of the trunnions on the rail. On one of the platforms 13 is provided a support 21 for the fluid pressure motor 22 which actuates the piston rod 23 and crosshead 24 to move the trunnion lug 25 and cause the tilting movement of the car body. The motor 22 may comprise some usual form of cylinder and piston 22$^a$ adapted to be operated by fluid pressure of some sort. The piston rod 23 slides in the guide support 23$^a$ and is therefore not capable of being moved out of its plane of motion.

Referring to Figs. 3 to 5 inclusive, it will be seen that the crosshead 24 is illustrated as being generally U-shaped and adapted to contain the bearing brasses or bearing member 28 which is illustrated as being made in a single piece but it will be understood that in order to compensate for wear, this bearing member may be made in several parts.

The side faces 29 of the bearing member are convexed on a curve having a radius drawn to the center of the trunnion lug 25. The cooperating inside faces 29$^a$ of the U-shaped crosshead member are curved inwardly as shown in order to receive the bearing member 28 and permit the same to be movable vertically within the crosshead member. Clearance spaces 30 and 31 are provided at the bottom and top of the bearing member. A bridging member 32 secured by bolts 33 extends across the top of the crosshead member and prevents the bearing member 28 accidentally coming out of the crosshead member.

In operation, the axis of the trunnions is normally parallel with that of the underframe 10 as the car body moves to or from a tilting position. If cinders or some other cause should result in one trunnion being moved ahead of the other so that their axis is no longer parallel with the underframe and the angle between said axis and the track 14 is changed, it will be apparent that such slight rotation in a horizontal plane is compensated for by the bearing member 28 turning along its curved outside faces to prevent the transmission of any excessive bending strains to the piston rod. In event that the trunnion on one side of the car body is raised above that on the opposite side, the bearing member 28 is then capable of sliding vertically within the crosshead member and if necessary, the piston rod and piston may be given a slight rotation within the cylinder and bearings to allow the trunnions to be located at different heights. These movements of the trunnions out of normal position and alignment do not occur in the usual operation but are only considered because the numerous shocks and obstacles to which the car body and its mounting are subjected in all kinds of work might be responsible for either or both of the above mentioned kinds of displacement being given the trunnions and it is to take care of an unusual occurrence of this sort that the present invention has been brought forward.

What I claim is:

1. The combination in a dumping car with a tilting and laterally movable car body, of trunnions on which the same is mounted, a laterally extending driving member connected to a trunnion for dumping said car body, a motor for actuating said driving member, and means connected to said driving member and located between said trunnion and motor for permitting movement of the trunnion axis in any direction without interrupting or disconnecting said last mentioned means and driving member or imposing excessive strains thereon.

2. The combination with a dump car body, of a track, trunnions supporting said car body and adapted to roll on said track in dumping, racks paralleling said track, pinions on said trunnions for engagement with said racks, a driving member for said car body arranged substantially parallel with said track and connected to one trunnion, a motor for actuating said member, and a flexible coupling means between said motor and connected trunnion enabling a trunnion to be raised and engage rack teeth ahead or behind the other trunnion.

3. The combination in a dumping car with a tilting and laterally movable car body, of trunnions on which the same is mounted, a supporting frame for each trunnion, a truck beneath each frame, a motor mounted over a truck for actuating the trunnions in dumping said car body, and means between said motor and trunnions permitting one trunnion to be raised and moved ahead or behind the other.

4. The combination in a dumping car with a tilting and laterally moving car body, of trunnions on which the same is mounted, a laterally extending driving member connected to a trunnion for dumping said car body, a flexible driving connection for the trunnions permitting limited movement of the trunnion axis in vertical and horizontal planes, and a non-rotatable vertical guideway along which limited free movement of the trunnion axis is permitted.

5. The combination in a single dumping car with a car body capable of tilting and laterally moving to one side, of trunnions on which the same is mounted, pinions on said trunnions, racks engaged by said pinions and along which the trunnions move in tilting the car body, a motor connected with a trunnion for dumping the car body, and means between the motor and trunnion permitting one trunnion to be raised or moved ahead or behind the other without raising or twisting said motor.

6. The combination in a dumping car with a tilting and laterally movable car body, of trunnions on which the same is mounted, a track along which the trunnions roll in dumping, a laterally extending driving member connected to one of said trunnions for dumping the car body, a motor for actuating the driving member, and means between said driving member and trunnion permitting a change in the angle between said track and trunnions.

7. The combination with a dump car body mounted on trunnions, of a lug on one of said trunnions, a reciprocal driving member in cooperation with said lug for tilting the car body, a bearing member in said driving member, the lateral faces of said bearing member being convexed and curved about the vertical center line of said lug, the portion of the driving member in cooperation with said bearing members being concave and having the same radius as the convex faces of the bearing member.

8. The combination with a dump car body mounted on trunnions, of a lug on one of said trunnions, a reciprocal piston, piston rod and crosshead for driving said trunnion lug in tilting the car body, a bearing member surrounding said lug and slidable substantially vertically within said crosshead, said bearing member being adapted for limited rotation in a horizontal plane within the crosshead, and said crosshead, piston rod and piston being adapted for limited rotation about their longitudinal axis.

9. The combination with a dump car body mounted on trunnions, of a track along which the trunnions are adapted to roll in tilting the car body, a reciprocal driving member for said trunnions, means for guiding the driving member for movement in a straight line, a connection between said driving member and trunnions, said connection comprising a bearing member rotatable about a vertical axis to permit rotation of the axis of the trunnions in a horizontal plane, said bearing member being slidable substantially vertically and the driving member being rotatable about a horizontal axis to compensate for movement of the axis of the trunnions in a vertical plane.

10. The combination in a dumping car with a tilting and laterally movable car body, of trunnions on which the same is mounted, a track along which the trunnions roll in dumping, a motor for actuating a trunnion in dumping, a supporting frame for each trunnion, trucks beneath each trunnion and its supporting frame, and means between the motor and its trunnion permitting a change in the angle between a trunnion and its track in any dumping position and independently of the alignment of said trucks.

11. The combination in a dumping car with a tilting and laterally movable car body, of trunnions on which the same is mounted, a motor comprising a relatively movable lateral piston and cylinder for actuating one of the trunnions in dumping, and means between the motor and trunnion permitting one trunnion to be raised and moved ahead or behind the other and adapted on movement of the trunnions in a vertical plane to produce relative rotation between the cylinder and piston.

Signed at New York, in the county of New York and State of New York this 11th day of August A. D. 1922.

CARL P. ASTROM.